United States Patent
Bauer et al.

(10) Patent No.: US 6,908,660 B2
(45) Date of Patent: Jun. 21, 2005

(54) SHAPED BODY MADE OF FIBER-REINFORCED COMPOSITES HAVING A SEGMENTED COVERING LAYER, ITS PRODUCTION AND ITS USE

(75) Inventors: Moritz Bauer, Augsburg (DE); Nadine Hander, Gersthofen (DE); Andreas Kienzle, Thierhaupten (DE); Rainer Zimmermann-Chopin, Ellgau (DE)

(73) Assignee: SGL Carbon AG (DE)

( * ) Notice: Subject to any disclaimer, the term of this patent is extended or adjusted under 35 U.S.C. 154(b) by 38 days.

(21) Appl. No.: 10/301,941

(22) Filed: Nov. 22, 2002

(65) Prior Publication Data

US 2003/0207749 A1 Nov. 6, 2003

(30) Foreign Application Priority Data

Nov. 23, 2001 (DE) .......................... 101 57 483

(51) Int. Cl.[7] .............. B32B 3/28; B05D 3/02; C01B 31/00; F16D 11/00; F16D 65/00; C04B 33/34; F41H 5/02
(52) U.S. Cl. .............. 428/163; 428/172; 427/228; 264/29.1; 260/998.13; 192/107 M; 188/73.1; 188/215; 188/251 R; 156/89.25; 156/89.26; 156/89.28; 89/36.02
(58) Field of Search .............. 428/156, 172, 428/163, 167, 212; 89/36.01, 36.02; 188/215, 250 R, 251 R, 251 M, 71.1, 73.1; 192/53.1, 107 M, 113.22; 156/89.25, 89.26, 89.28, 329; 260/998.13; 423/447.2; 264/29.1, 319; 427/228, 372.2

(56) References Cited

U.S. PATENT DOCUMENTS 6,042,935 A    3/2000    Krenkel et al.
6,077,607 A    6/2000    Zornik
6,086,814 A    7/2000    Krenkel et al.

FOREIGN PATENT DOCUMENTS

| DE | 40 03 336 | 8/1991 | |
| DE | 43 22 113 | 1/1994 | |
| DE | 44 38 455 | 2/1996 | |
| DE | 44 38 455 C1 | 5/1996 | ............ C09K/3/14 |
| DE | 197 10 105 A1 | 9/1998 | ........... C04B/35/83 |
| DE | 197 11 829 C1 | 9/1998 | ........... C04B/35/80 |
| DE | 198 05 868 A1 | 10/1999 | ............ B28B/1/52 |
| DE | 198 56 721 A1 | 6/2000 | ........ C04B/35/577 |
| DE | 199 53 259 A1 | 5/2001 | ........... C04B/35/80 |
| EP | 0770791 A2 * | 5/1997 | ........... F16D/69/04 |
| EP | 0 818 636 | 1/1998 | |
| EP | 0 818 636 A1 | 1/1998 | ........... F16D/65/12 |
| WO | WO-02/46124 | 6/2002 | |
| WO | WO-02/070916 | 9/2002 | |

* cited by examiner

Primary Examiner—Donald J. Loney
(74) Attorney, Agent, or Firm—Connolly Bove Lodge & Hutz LLP

(57) ABSTRACT

The present invention relates to shaped bodies made of fiber-reinforced ceramic composites and comprising a core zone and at least one covering layer which has a coefficient of thermal expansion which is higher than that of the core zone. The covering layer is an SiC-rich covering layer and is divided into segments which are separated from the adjacent segments by gaps or bridging zones of a material which is different from the material of the segments. The invention also relates to a process for producing such shaped bodies by infiltration of an intermediate body with molten silicon and their use for friction disks, in vehicle construction or as protective plates.

22 Claims, 1 Drawing Sheet

SHAPED BODY MADE OF FIBER-REINFORCED COMPOSITES HAVING A SEGMENTED COVERING LAYER, ITS PRODUCTION AND ITS USE

FIELD OF THE INVENTION

The invention relates to a shaped body made of fiber-reinforced ceramic composites which is built up of a core layer and at least one covering layer and whose matrix comprises predominantly silicon carbide (SiC), silicon (Si) and carbon (C) The invention also relates to a process for producing a shaped body made of fiber-reinforced composites and shaped bodies of this type which are configured as friction disks, brake disks or clutch disks. A particularly preferred embodiment of the invention comprises brake disks which are made up of C/SiC or C/C-SiC and in which the covering layer has a higher coefficient of thermal expansion or a higher SiC content than the core zone.

BACKGROUND OF THE INVENTION

C/SiC materials (ceramic materials which are reinforced with carbon fibers and have a matrix comprising SiC) for the shaped body of the invention include, inter alia, the materials described in the following documents: DE-A 198 56 721, DE-A 197 11 829 and DE-A 197 10 105.

In general, C/SiC is produced by firstly producing an open-pored carbon-containing intermediate body comprising reinforcing fibers and a carbon-containing matrix, generally a body made of a carbon material reinforced with carbon fibers (known as CFC or C/C). This is shaped to bring it close to its final shape and then infiltrated with a silicon melt at temperatures of about 1600° C. under reduced pressure or under inert gas, which results in at least part of the carbon of the matrix and/or of the fibers being converted into SiC. This forms a dense, strong and very hard material containing fibers, generally carbon fibers, with a matrix consisting predominantly of SiC, Si and C. Owing to the liquid silicization process, the material has to be cooled from at least about 1600° C. to room temperature after it has been produced. Thermal shrinkage takes place within this temperature range and this can be significantly different for each of the materials present depending on their coefficient of thermal expansion.

In the production of high-performance brake disks or clutch disks made of C/SiC, it is customary to provide the core body made of a base material with a covering layer having particular frictional properties. Such a brake disk having a wear-resistant covering layer (friction layer) and methods of producing it are known from, inter alia, DE-A 44 38 455, but this does not discuss the differences between the material of the core body and the friction layer.

It is known that the frictional properties and their uniformity can be improved by increasing the SiC content of the friction layer and that the wear of the components can be reduced thereby. DE-A 198 05 868 and EP-A-0 818 636 describe generic brake disks having C/SiC friction layers which have an SiC content which is higher than that of the core body and can be up to almost 100%. The friction layers are produced by silicization of C/C intermediate bodies, with the higher SiC content of the friction layer being achieved by means of the degree of conversion in the silicization reaction of the C/C to form SiC; in the first case by means of a higher reactivity of the friction layer C/Cs and in the second case by a reduction in the silicon available in the core body.

C/SiC materials of construction produced by the liquid silicization method are also known from, for example, DE-A 199 53 259. For particular applications, e.g. protective plates, the application of hard material layers having a high SiC content is desirable so as to improve the properties.

The typical coefficient of thermal expansion of these SiC-rich covering layers comprising SiC, SiSiC or C/SiC is in the range from about 2.5 to $5 \times 10^{-6}$ $K^{-1}$. The typical coefficient of thermal expansion of the C/SiC core body which is lower in silicon carbide is, on the other hand, in the range from about 0.5 to $3 \times 10^{-6}$ $K^{-1}$.

During the cooling from the silicon melt temperature (about 1420° C.) to room temperature (about 20° C.) necessary in the liquid silicization production process, the different coefficients of thermal expansion lead to thermally induced stresses which result in a pronounced pattern of cracks in the layer which are visible to the eye.

This pattern of cracks is usually completely random and is characterized by a low degree of order.

The load states which are usual for brake and clutch disks are characterized by ongoing heating and cooling processes, with continuing cyclic thermal stress being general during use of the components for the purpose for which they are designed. The high thermally induced stress peaks are dissipated in the material by the formation of further cracks or by growth of existing cracks.

In the case of metallic materials, the accumulation and growth of cracks give information on the state of wear or damage to the material, so that the cracks can be employed as an early indicator of possible mechanical failure of a component.

A similar type of behavior is displayed by fiber-reinforced ceramic composites, with the formation of new cracks occurring to a much greater extent than the growth of existing cracks.

A disadvantage of the pattern of cracks known from the prior art in SiC-rich covering layers is that the cracks arising from the production process itself cannot be unambiguously distinguished from cracks which are newly formed as a result of cyclic thermal stress. The visible cracks can therefore not be employed reliably as an early indicator of wear of the material.

In the case of C/SiC construction materials, a disordered pattern of cracks is undesirable for reasons of aesthetics, in the case of protective plates particularly because of the required function, since it gives an impression of lower product quality. It is therefore desirable to avoid the formation of cracks completely or at least to limit them to defined, restricted regions.

SUMMARY OF THE INVENTION

It is therefore an object of the present invention to provide shaped bodies made of fiber-reinforced C/SiC composite materials having SiC-rich covering layers, in which cracks formed in the covering layer during the production process are concentrated in previously defined regions and can easily be distinguished from cracks induced later as a result of cyclic thermal stress during later use of the composite for the purpose for which it is intended. The cracks formed during the production process should preferably be arranged in ordered geometric patterns. Newly formed cracks arising in the subcritical range of material wear should preferably be concentrated in the regions in which cracks are already present.

According to the invention, this object is achieved by shaped bodies made of fiber-reinforced composites of the generic type mentioned at the outset, whose distinguishing feature is that the covering layer is an SiC-rich covering layer having a mass fraction of SiC of at least 30% and is divided into segments which are separated from one another by gaps or bridging zones of a material which is different from the material of the segments.

According to the invention, the size of the segments and their bonding to the core body are selected so that the segments have virtually no cracks or no readily discernible cracks. The material of the bridging zones preferably has a higher content of SiC or metal carbides or of Si or metals than the material of the segments of the covering layer which are separated by the bridging zones.

According to the invention, the thermal stresses occurring within the individual segments are reduced compared to a coherent covering layer to such an extent that they can no longer lead to rupture within the region of the individual segments. Since the bridging zones comprise, according to the invention, materials which are different from those of the segments and have different thermophysical properties, the thermal stresses which occur can be transferred in a targeted manner into the region of the bridging zones, with both crack-containing and crack-free bridging zones being able to be realized.

In the shaped bodies of the invention, a distinction is made between a core zone and a covering layer. In the following, the term "covering layer" will be used to refer to the region divided into segments but not the grooves or bridging zones between the segments.

DETAILED DESCRIPTION OF THE PREFERRED EMBODIMENTS

The matrix of the core zone and of the covering layer is preferably made up predominantly of Si, SiC and C, and the reinforcing fibers are preferably selected from the group consisting of carbon fibers, graphite fibers and fibers comprising compounds of at least two elements from the group consisting of Si, C, B, Al, N and P.

It is further preferred that the covering layer has a higher mass fraction of Si and/or SiC and a lower mass fraction of fibers than the core zone.

The core zone typically comprises C/SiC reinforced predominantly by short fibers or short fiber bundles. The fibers are usually carbon-containing fibers, preferably carbon or graphite fibers, particularly preferably coated with carbon. The mass fraction of fibers is in the range from 20 to 60%, while the mass fraction of SiC is in the range from 30 to 70% and the mass fraction of Si is in the range from 0 to 30%, with all mass fraction in % being based on the total mass of the core zone. The covering layer typically has a mass fraction of fibers in the range from 0 to 35%, and the mass fraction of SiC in the covering layer is in the range from 45 to 100% and the mass fraction of Si in the covering layer is in the range from 0 to 30%, in each case based on the total mass of the covering layer.

In the novel shaped bodies made of fiber-reinforced composites, it is particularly advantageous for the above-mentioned SiC content of the covering layer to be at least 10% higher than the SiC content of the core zone. The distinction between the core zone and the covering layer is also apparent in the density of the material. In the case of the core zone, this is typically above 1.9 g/cm$^3$, preferably from 2.2 to 2.5 g/cm$^3$. The density of the covering layer is typically above 2 g/cm$^3$, preferably in the range from 2.3 to 2.6 g/cm$^3$. The density of the covering layer is preferably at least 5% higher than the density of the core zone.

Depending on the application and requirements, the novel shaped bodies made of fiber-reinforced composites can have different material compositions and different thicknesses of the covering layer. For tribological applications such as friction disks, the thickness of the SiC-rich covering layer is usually at least 0.1 mm, preferably at least 0.5 mm and particularly preferably at least 1 mm. In the case of materials of construction, the covering layer may also have a thickness of above 3 mm. Applications of interest for the materials of construction are, for example, automobile construction and aircraft construction. These materials are particularly preferably also used for producing protective plates.

According to the invention, the covering layer of the shaped bodies made of fiber-reinforced composites is divided into segments which preferably have a regular structure. The covering layer is in this case made up of repeating structural elements. This is achieved by the covering layer being divided up into the individual segments by gaps or bridging zones of a material different from that of the segments. The individual segments preferably have predominantly the same geometric shape and a repeating arrangement. Typical geometric shapes are segments of a circle or annulus, hexagons, rectangles, trapezoids, lozenges (diamonds) and circles.

Typical geometric embodiments are described in more detail with the aid of the following drawings.

Figures 1, 2, 3, 4, 5:
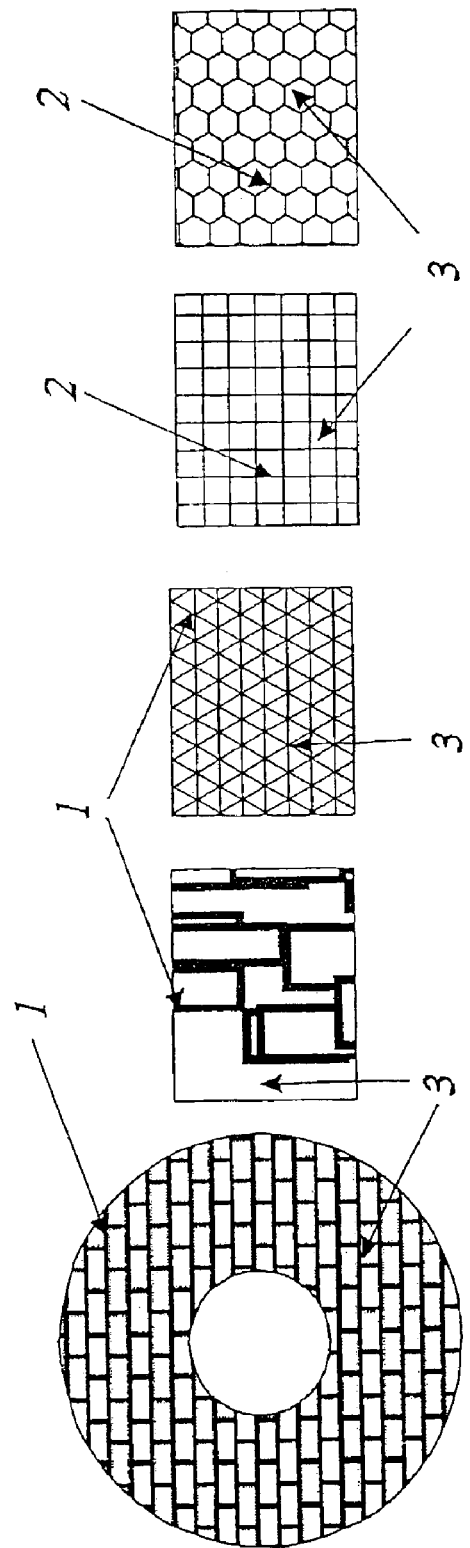
FIG. 1 depicts a plan view of a brake disk showing the segmented friction layer
FIG. 2 shows a section of a protective plate with a plan view of the segmented covering layer
FIG. 3 shows a section of a clutch disk with a plan view of the segmented friction layer
FIG. 4 shows a section of a protective plate with a plan view of the segmented covering layer
FIG. 5 shows a section of the friction surface of a brake disk with a plan view of the segmented friction layer.

FIG. 1 depicts a plan view of a brake disk having a segmented friction layer. Fixing holes and devices for attachment to the hub are not shown in the interests of simplicity. The friction surface of the brake disk having an external diameter of 350 mm is formed by equal-sized square segments (3) which are separated from one another by bridging zones (1). The dimensions of the individual segments are about 15 mm×32 mm and the width of the bridging zones is about 5 mm.

FIG. 2 shows a plan view of a section of a protective plate having a segmented covering layer. The covering layer is an SiC-rich hard material layer which is divided up into irregular rectangular segments by bridging zones (1) of metal (aluminum alloy). The area and the length and breadth of the segments (3) are here selected in a random fashion and are in the range from about 0.3 to 36 cm$^2$ and from 0.1 to 6 cm, respectively. The width of the bridging zones is about 4 mm.

FIG. 3 shows a section of a clutch disk in plan view. The covering layer of the clutch disk is divided into regular triangular segments (3) by bridging zones (1). The width of the bridging zones is about 1 mm.

FIG. 4 shows a plan view of a section of a protective plate for use as armour plate. The covering layer of the protective plate is divided into regular rectangular segments (3) by grooves (2). The width of the grooves is about 1 mm.

FIG. 5 shows a section of a brake disk in plan view. The friction surface of the brake disk having an external diameter of 800 mm is formed by equal-sized segments (3) having the shape of hexagons which are separated from one another by grooves (2). The external diameter of the hexagons is about 4 cm and the width of the grooves is about 2 mm.

The mean diameter of individual segments of the novel shaped bodies made of fiber-reinforced composite is in the range up to 6 cm, preferably up to 4 cm and particularly preferably up to 3 cm. The area of an individual segment is preferably in the range from 0.04 to 36 cm$^2$ and particularly preferably from 1 to 25 cm$^2$.

In a first embodiment of the invention, gaps in the form of grooves are provided as separation between the segments. For some applications it is inconsequential whether the gaps are truly empty or are filled with a filler. The filler should merely have a significantly lower tensile and compressive modulus of elasticity and a significantly lower strength than the material of the covering layer. The gaps are usually filled with plastics or light metal when the fiber-reinforced composite is used as a material of construction. These filler materials are used, in particular, for adhesive bonding or joining to further components.

The joints or gaps located between the segments preferably have a width in the range from 0.1 to 10 mm, preferably from 0.5 to 5 mm.

In a second embodiment of the invention, the segments are separated from one another by means of bridging zones, with the material of the bridging zones having a coefficient of thermal expansion which is higher than that of the covering layer material in the segments. Selecting the coefficients of thermal expansion in this way results in cracks being formed preferentially in the region of the bridging zones. The cracks generated in the production of the shaped bodies made of fiber-reinforced composites are thus, according to the invention, restricted to precisely defined regions, namely the region of the bridging zones. Newly formed cracks in the region of the segments formed as a result of cyclic thermal stress during use for the intended purpose can therefore be readily recognized. An advantage is that the function of the covering layer within the segments is not initially impaired by undesirable cracks.

Depending on the difference between the coefficients of thermal expansion and the bonding between the core zone and the covering layer, a critical segment size must not be exceeded. This is, as mentioned above, at least 3 mm (mean) diameter, preferably at least 4 mm and in particular at least 6 mm.

The geometric ratios of segments and bridging zones or gaps play an important role in suppressing the formation of cracks in the segments during the production process, or reducing the number of cracks formed. The ratio of the maximum mean diameter of the segments to the width of the adjacent bridging zones or gaps is preferably above 2 and particularly preferably above 5. The bridging zones located between the segments preferably have a width in the range from 0.1 to 10 mm, particularly preferably from 0.5 to 5 mm.

It is also preferred that the joints or bridging zones located between the segments of the covering layer have a width of at least 0.1 mm and a depth or layer thickness of at least 10% of the layer thickness of the covering layer.

In a further embodiment of the invention, the layer thickness in the region of the bridging zones can be smaller than the layer thickness of the covering layer. In this embodiment, the individual segments of the covering layer are joined to one another on the free side facing away from the core zone by the bridging zones having a lower layer thickness.

In particular, the covering layer in this embodiment of the invention can therefore be closed on the top, i.e. on the free side facing away from the core zone, so that the material of the bridging zones does not come through to the surface of the covering layer. This is particularly advantageous when the material of the bridging zones would impair the function of the material of the covering layer. This embodiment of the invention is of interest for, for example, friction disks in which the material of the bridging zones has poor frictional properties. For the cracks formed during the production process to be in actual fact concentrated in the region of the bridging zones, it is necessary for the material of the bridging zones to have a minimum thickness. The layer thickness of the bridging zones is therefore, in particular, greater than 10% of the thickness of the covering layer and is preferably in the region of at least 50% of the thickness of the covering layer.

The coefficient of thermal expansion of the material of the bridging zones is adjusted via its chemical composition. The material of the bridging zones is not expected to perform the same function as the material of the covering layer, since the area of the segments is far greater than the area of the bridging zones. The material of the bridging zones is preferably, like the material of the segments of the covering layer, made up predominantly of SiC, Si and C, with the mass fraction of Sr and/or SiC in the bridging zones being greater than that in the segments of the covering layer. The mass fraction, measured in %, of Si and/or SiC in the material of the bridging zones is preferably 10 greater than the corresponding mass fraction in % in the material of the segments.

It is, however, also possible for other metals and/or metal carbides to be used in place of Si and SiC as significant constituents of the bridging zones. Such bridging zones are preferably made up of metals and/or metal carbides in an Si-containing matrix. As metal or metal carbide, it is possible, for the purposes of the invention, to use one or more metals from the group consisting of Ti, Cr, Fe, Co, Ni, Mo, Al, B and Zr. Here, the term metals includes their alloys, in particular their silicides and mixtures of these silicides. As material for the bridging zones, preference is given to titanium suicides and carbides, molybdenum suicides, titanium borides and iron/chromium silicides, in particular embedded in an Si-containing matrix.

In a further embodiment of the invention, the coefficient of thermal expansion of the material of the bridging zones is virtually identical to or lower than the coefficient of thermal expansion of the segments of the covering layer. In this case, The thermal shrinkage in the region of the segments on cooling during the production process for the shaped body made of fiber-reinforced composite is greater than in the region of the bridging zones. In this case, the bridging zones are therefore particularly low in cracks, frequently even completely free of cracks. This combination of coefficients of thermal expansion is achieved, for example, when the material of the covering layer has a very high mass fraction of SiC, in particular at least 75%, and the material of the bridging zones has a high mass fraction of carbon, in particular at least 50%.

Depending on the chemical composition of the material of the bridging zones, this makes it possible for the formation of cracks in the region of the segments during the production of the shaped body made of fiber-reinforced composite materials to be completely avoided. It has surprisingly been found that the formation of cracks is then restricted exclusively to the region of the bridging zones, or is completely suppressed even The invention also provides a process for producing shaped bodies made of fiber-reinforced composites and having a C/SiC core zone and at least one SiC-rich covering layer, in which a liquid silicization of intermediate bodies reinforced with carbon fibers (CFC, "Carbon Fiber-reinforced Carbon", or C/C bodies) is carried out.

Such production processes for C/SiC composites are known from the prior art, for example from DE-A 198 56 721, DE-A 199 53 259, DE-A 197 11 829 or DE-A 197 10 105.

In the process of the invention, a mixture of carbon-containing long fibers or short fibers, which may be collected into bundles and/or be coated with a coating, and fillers and/or binders, for example resin and/or pitch, is firstly prepared, the mixture is then shaped and cured in a known manner under pressure and/or at elevated temperature (120–280° C.) to form an intermediate body for the core zone, this is coated with a precursor material for a covering layer, subsequently pyrolyzed or graphitized to produce a shaped body comprising carbon reinforced with carbon fibers which is subsequently infiltrated with molten silicon under reduced pressure or under inert gas. The distinguishing feature of the process of the invention is that the material for the bridging zones or gaps is additionally applied, if appropriate with shaping and curing under pressure and/or elevated temperature, to the intermediate body for the core zone before, after or during the application of the precursor material for the covering layer.

During infiltration of at least an outer layer of the shaped body for the fiber-reinforced composite with the molten silicon, at least partial reaction of the carbon in the covering layer takes place to form SiC, and the carbon in the material of the bridging zones may also react in this way. This results in a shaped body which, at least in the outer layer, is made up of a composite ceramic comprising carbon-containing fibers embedded in a matrix of SiC, Si and C (here referred to as C/SiC)

The segmentation according to the invention of the covering layer is not restricted to the process step of liquid infiltration, but also extends to other methods of producing the high-temperature matrix. It is thus likewise possible for the matrix to be produced via customary methods of gas-phase infiltration (CVI) or pyrolysis of precursors. The precise material composition of the shaped body made of fiber-reinforced composites after silicization is adjusted, in particular, via the content of carbon and fibers in the intermediate CFC body.

The process step which is critical for segmentation, namely the production of the bridging zones, is illustrated below by way of example.

In a first embodiment of the invention, a pattern of bridging zones of a carbonizable resin mixture, in particular phenolic resin, is applied to the intermediate body for the core zone. This can be carried out by, for example, painting on or printing, in particular by screen printing. An SiC powder mixture having a mass fraction of SiC of preferably at least 70% is applied to this still sticky resin mixture in such a way that it remains essentially only on the bridging zone. The resin mixture to which the SiC powder mixture is adhering is then cured. The segments between the bridging zones are then filled with the material of the covering layer and processing is continued as described above. During the pyrolysis, the binder, namely the carbonizable resin, is carbonized to form a porous carbon matrix. In the process step of infiltration with molten silicon, this porous carbon matrix is at least partly converted into a solid SiC binder phase. The carbon of the bridging zones is converted into SiC or at least Si/SiC.

In a further advantageous embodiment of the invention, a mixture of resin and SiC powder mixture is prepared and bridging zones are applied to the intermediate body for the core zone by screen printing or are painted on. The material for the covering layer is then applied.

In another embodiment of the invention, bridging zones made of polymer which can be pyrolyzed to leave little or no residue or mixtures of such polymers are applied to the intermediate body for the core zone, for example by adhesive bonding, thermotransfer printing, screen printing, spraying or painting. Unlike the variants described above, pyrolysis does not result in formation of carbon from the bridging zones of pyrolyzable polymer, but instead the polymer is completely decomposed by heat. This results in gaps which are retained even during the subsequent silicization.

In a further possible embodiment of the invention, the covering layer is pressed onto or adhesively bonded to the intermediate body for the core zone and a pattern of grooves is milled into the covering layer to form the desired segments. The grooves can, prior to the silicization, be filled either with powder mixtures which react with molten silicon to form compounds having a higher coefficient of thermal expansion than that of the material of the covering layer so as to form bridging zones or with powder mixtures which can be decomposed to leave little or no residue at the temperature of the silicon infiltration, as a result of which the grooves are retained as gaps even after infiltration with liquid silicon.

The novel shaped bodies having a segmented covering layer can be used as friction bodies, in particular as friction disks, or in the form of plates as material to protect against impact of projectiles. When the shaped bodies are used as friction disks, in particular as clutch or brake disks, it is particularly advantageous for the covering layers in the new state to have no cracks and the cracks occurring during use then being able to serve as an indicator of the remaining life of the friction disk.

What is claimed is:

1. A shaped body made of fiber-reinforced ceramic composites and comprising a core zone and at least one covering layer which has a coefficient of thermal expansion which is higher than that of the core zone, wherein the covering layer is an SiC-rich covering layer having a mass fraction of SiC of at least 30% and is divided into segments which are separated from one another by grooves or bridging zones of a material which is different from the material of the segments, and wherein the ratio of the mean diameter of the segments and the width of the grooves or bridging zones is at least 2.

2. The shaped body as claimed in claim 1, wherein the matrix of the core zone and of the covering layer is made up predominantly of Si, SiC and C and the reinforcing fibers are selected from the group consisting of carbon fibers, graphite fibers and fibers comprising compounds of at least two elements from the group consisting of Si, C, B, Al, N and P.

3. The shaped body as claimed in claim 1, wherein the covering layer has a higher mass fraction of Si and/or SiC and a lower mass fraction of fibers then the core zone.

4. The shaped body as claimed in claim 1, wherein the mean diameter of the individual segments is in the range up to 6 cm and the mean area of the individual segments is in the range from 0.04 to 36 cm2.

5. The shaped body as claimed in claim 4, wherein the ratio of the mean diameter of the segments and the width of the grooves or bridging zones is above 5.

6. The shaped body as claimed in claim 1, wherein the grooves or bridging zones located between the segments of the covering layer have a width of at least 0.1 mm and a depth or layer thickness of at least 10% of the thickness of the covering layer.

7. The shaped body as claimed in claim 1, wherein the majority of the segments are arranged regularly.

8. The shaped body as claimed in claim 1, wherein the material of the bridging zones is made up predominantly of SiC, Si and C, with the mass fraction of Si and/or SiC in the region of the bridging zones being higher than that in the segments of the covering layer.

9. The shaped body as claimed in claim 1, wherein the material of the bridging zones comprises essentially metals and/or metal carbides.

10. A process for producing a shaped body as claimed in claim 1, in which a mixture of carbon-containing long fibers or short fibers, and fillers and/or binders, is firstly prepared, the mixture is then shaped and cured under pressure and/or at elevated temperature to form an intermediate body for the core zone, which subsequently is coated with a precursor material for a covering layer, subsequently pyrolyzed or graphitized to produce a shaped body comprising carbon reinforced with carbon fibers which is subsequently infiltrated with molten silicon under reduced pressure or under inert gas, wherein the material for the bridging zones or grooves is additionally applied, to the intermediate body for the core zone before, after or during the application of the precursor material for the covering layer.

11. The process as claimed in claim 10, wherein a pattern of bridging zones of a carbonizable resin mixture is applied to the intermediate body for the core zone, a SiC powder mixture having a mass fraction of SiC of at least 70% is applied to this still sticky resin mixture in such a way that it remains essentially only on the bridging zone, the resin mixture to which the SiC powder mixture is adhering is cured, the segments located between the bridging zones are subsequently filled with the material of the covering layer and this completes intermediate body is pressed, carbonized and subsequently infiltrated with liquid silicon.

12. The process as claimed in claim 10, wherein a mixture of resin and SiC powder mixture is applied by screen printing to the intermediate body for the care zone to produce the pattern of bridging zones.

13. The process as claimed in claim 10, wherein bridging zones of pyrolyzable polymer or pyrolyzable polymer mixtures are applied to the intermediate body for the core zone.

14. A process for producing a shaped body as claimed in claim 1, in which a mixture of carbon-containing long fibers or short fibers, and fillers and/or binders, is firstly prepared, the mixture is then shaped and cured under pressure and/or at elevated temperature to form an intermediate body for the core zone, this is coated with a precursor material for a covering layer, subsequently pyrolyzed or graphitized to produce a shaped body comprising carbon reinforced with carbon fibers, wherein a pattern of grooves forming segments is milled into the covering layer after pyrolysis or graphitization and the shaped body which has been machined in this way is subsequently infiltrated with molten silicon under reduced pressure or under inert gas.

15. The process as claimed in claim 14, wherein the grooves are filled with powder mixtures for the formation of bridging zones prior to the silicon infiltration.

16. A process for producing a shaped body as claimed in claim 1, in which a mixture of carbon-containing long fibers or short fibers, and fillers and/or binders, is firstly prepared, the mixture is then shaped and cured under pressure and/or at elevated temperature to form an intermediate body for the care zone, this intermediate body is provided on at least one side with a covering layer, with core zone and covering layer being joined to one another by pressing or adhesive bonding, and a pattern of grooves is subsequently milled into the covering layer to form segments in the covering layer, after which the shaped body which has been machined in this way is infiltrated with liquid silicon under reduced pressure or under inert gas.

17. The process as claimed in claim 16, wherein the grooves are filled with powder mixtures which react with molten silicon to form compounds having a coefficient of thermal expansion which is higher than that of the material of the carbon layer so as to form bridging zones.

18. The process as claimed in claim 16, wherein the grooves are filled with powder mixtures which are decomposed so as to leave little or no residue at the temperature of the silicon infiltration, as a result of which the grooves are retained as grooves even after the infiltration with liquid silicon.

19. A method of use of a shaped body as claimed in claim 1 as a friction body, comprising forming the body in the shape of a disk.

20. The method of claim 19, comprising forming its shaped body in the shape of a brake disk.

21. The method of claim 19, comprising forming its shaped body in the shape of a clutch disk.

22. A method of use of a shaped body as claimed in claim 1, comprising forming the shaped body in the shape of a protective plate.

\* \* \* \* \*

UNITED STATES PATENT AND TRADEMARK OFFICE
CERTIFICATE OF CORRECTION

PATENT NO. : 6,908,660 B2  
DATED : June 21, 2005  
INVENTOR(S) : Moritz Bauer et al.

It is certified that error appears in the above-identified patent and that said Letters Patent is hereby corrected as shown below:

Column 10,
Line 19, delete "care" and insert -- core --.

Signed and Sealed this

Fourth Day of October, 2005

JON W. DUDAS
*Director of the United States Patent and Trademark Office*